Sept. 30, 1958 R. LOEWY 2,853,897

EXTENSIBLE TELEVISION CONTROLS

Filed March 10, 1955 3 Sheets-Sheet 1

INVENTOR.
RAYMOND LOEWY

BY Ostrolenk & Faber
ATTORNEYS

EXTENSIBLE TELEVISION CONTROLS

Filed March 10, 1955 3 Sheets-Sheet 2

INVENTOR.
RAYMOND LOEWY
BY
Ostrolenk & Faber
ATTORNEYS

Sept. 30, 1958 R. LOEWY 2,853,897

EXTENSIBLE TELEVISION CONTROLS

Filed March 10, 1955 3 Sheets-Sheet 3

INVENTOR.
RAYMOND LOEWY

BY

Ostrolenk & Faber

ATTORNEYS

United States Patent Office 2,853,897

Patented Sept. 30, 1958

2,853,897

EXTENSIBLE TELEVISION CONTROLS

Raymond Loewy, New York, N. Y.

Application March 10, 1955, Serial No. 493,522

3 Claims. (Cl. 74—504)

My present invention relates primarily to television control units and more specifically to extensible controls built in or connectable to a television set to permit the operation of the controls of the television set while the viewer is seated at a distance from the television set.

As is well known, the position of optimum viewing of a television picture is at a distance from the television set which is much greater than the arm's length of the viewer so that a manipulation of the controls of the television set requires the viewer to leave the seat from which he is viewing the set, make the adjustment and then return to the viewing point. In the event that there is any need or desire to change the channel which is being received or to change the set volume or brightness, it is necessary for the viewer to leave his viewing point, make the adjustments at the set and then return.

This problem has not heretofore arisen in connection with radio receivers adapted to receive sound only since it is possible to enjoy non-video radio reception adjacent to the set.

However, in the case of television, the necessary distance which the viewer must place between himself and the set necessitates frequent trips from the viewing point to the set to make adjustments.

Attempts have heretofore been made to solve this problem by electronic, electrical and mechanical means. Thus, one known way of making the adjustments at a distance from the picture is actually to place the entire tuner, on-off switch, volume control and other controls in a separate box connected by an appropriate cable to the remainder of the circuits in the set and to make this cable long enough so that the box may be placed at an optimum viewing distance from the set. This involves two cabinets, a heavy cable in which the many conductive means create many electrical problems, and an increase in the cost of the set beyond commercial availability.

Other means have been provided for operating the tuner of the set from a remote point by means of electric motors, magnet armatures and detents, electromechanical devices, all of which must be built into the set and increase the expense thereof.

Means have also been attempted comprising extensible units mechanically attachable to the knobs of the set but which, therefore, when not in use were required to project a substantial distance from the front of the set.

My present invention contemplates so constructing the television tuner and other controls of the television set as to provide means for housing extensible control elements entirely within the set so that the set in use may be operated in the ordinary manner while nevertheless the viewer, should he decide to locate himself for an extended period of time at an optimum viewing distance, may pull out the extensible controls so that the control members including the tuner, volume control and other elements of the set will be available to him at his viewing position.

When the viewing period is completed, the viewer may then push back the extensible controls into the set to a position where the knob at the end of each of the extensible controls will lie against the front surface of the set as an apparent permanently located control knob.

The primary object of my invention, therefore, is the provision of a television set where the control members may be housed within the tuner or other control elements and, therefore, within the cabinet itself, but wherein the control members may be extended so that they are accessible from an appropriate viewing position.

The foregoing and many other objects of the invention will become apparent in the following description and drawings in which.

Figures 1, 2:
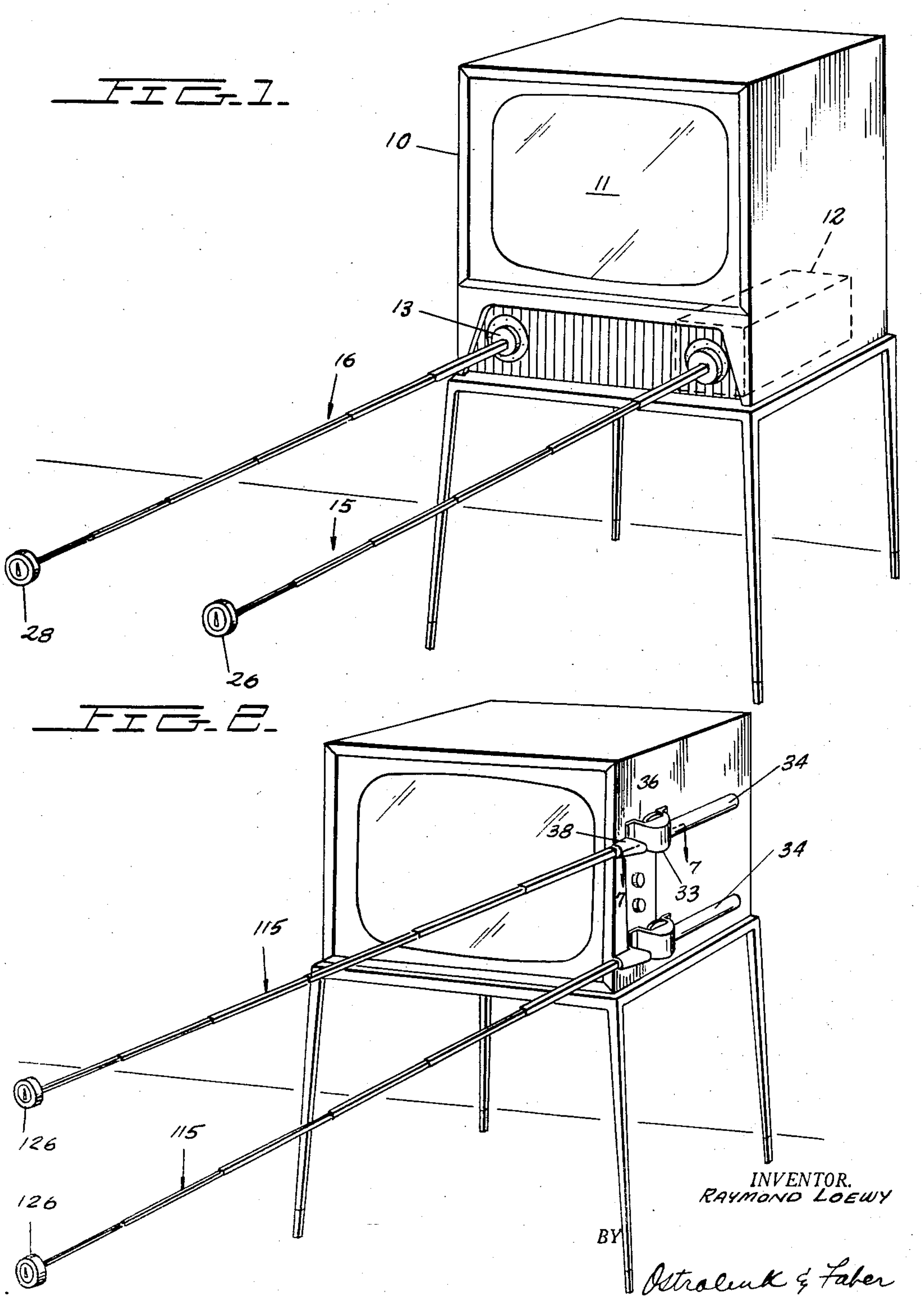
Figure 1 is a view in perspective of a television set with extensible control members for the tuning unit and the on-off switch and volume control, the said extensible control members being shown extended for operation at a distance by the viewer.
Figure 2 is a view in perspective showing a modified form of the present invention adapted for use with respect to side mounted control members of a television set.

Referring to Figure 1, I have there shown a television cabinet 10 having a viewing screen 11, a tuner 12 mounted in the cabinet and an on-off switch volume control arrangement 13 also mounted in the cabinet.

Extensible control members 15 and 16 comprise telescoping elements preferably of rectangular cross-section but generally having such cross-section that rotation of one of the elements of the telescoping operating member will result in rotation of all of the other elements.

Figures 3, 4, 5, 6:
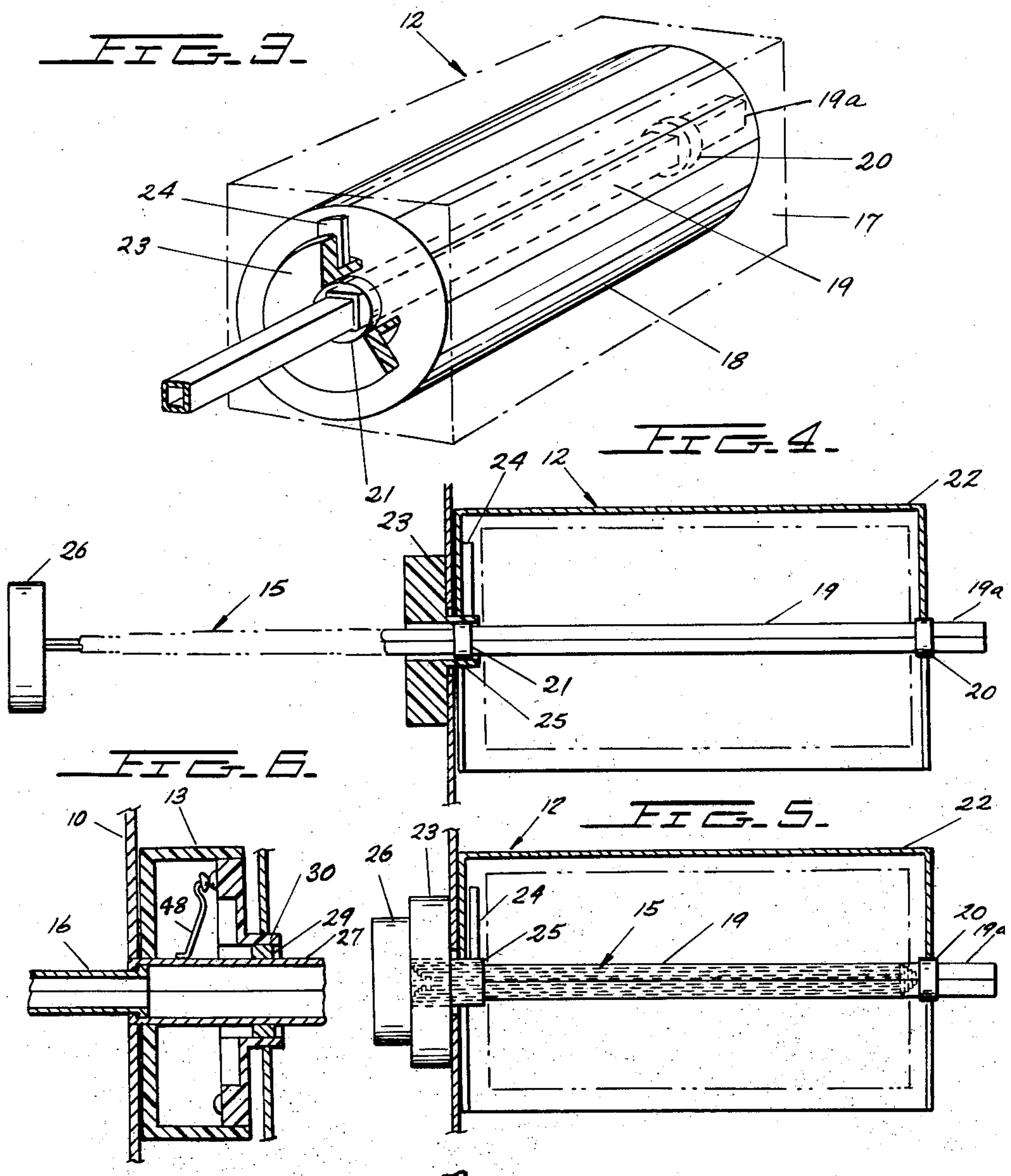
Figure 3 is a schematic view in perspective snowing the manner in which a standard tuner may be modified in its original manufacturing process to receive and contain the extensible control members.
Figure 4 is a longitudinal cross-sectional view of the tuner of Figure 3 showing the manually operable extensible control members extended.
Figure 5 is a view similar to that of Figure 4 showing the extensible control members retracted or pushed back into the tuning device.
Figure 6 is a cross-sectional view showing the method of operation of the on-off switch and volume control by the extensible control members.

As seen in Figures 3, 4, and 5, the television tuner 12 is mounted in its chassis 17 in which is mounted a rotatable channel selector 18. Ordinarily, such rotatable channel selectors 18 are provided with a solid shaft extending toward the front of the set on the end of which outside the set a manual control knob may be mounted for operating the tuner.

In this case, the rotatable member of the tuner is provided with a hollow rectangular shaft 19 having appropriate collars 20 and 21 at the front and rear ends of the rotatable selector 18 to ride in bearings in the chassis 22 of the tuner and thereby permit rotation of the selector 18 to occur.

The hollow rectangular member 19 may extend at 19*a* beyond the rear of the chassis 22 or an appropriate length as determined by the length of the individual extensible members of the tuner control. A plurality of hollow rectangular telescoping rods designated collectively by the reference numeral 15 is mounted in the hollow member 19 so that they may be nested or telescoped successively into each other as shown in Figure 5 and so that they may be extended in telescopic fashion as shown in Figures 1, 3, and 4.

As previously pointed out, while these members are preferably of rectangular cross-section, they may be of any appropriate cross-section including elliptical or ellipsoid or any polygon in addition to a rectangular one so that rotation of any element of the telescopic member will result in rotation of all of the elements of the telescopic member including the hollow shaft 19 of the tuner.

The tuner 12 is also shown as having a fine tuning knob 23 operating a fine tuning element 24, both of which rotate together around the collar 21 and are in turn housed in an appropriate bearing 25 in the front end of the chassis.

With modern set construction in ordinary non-fringe receiving areas, it is ordinarily not necessary to operate the fine tuning knob 23 in going from station to station and, therefore, no provision is made for extensible manual control of the fine tuning knob 23. However, should it be desired to provide extensible control for the fine tuning knob 23, the fine tuner and its knob may be mounted at the rear of the chassis 22, and the extensible controls for the fine tuner 24 may then extend through the hollow telescoping structure 19—15 and through an opening in the tuner operating knob 26 in order to be accessible to the user.

As will now be obvious, placement of the operating knob 26 for the tuner at the front of the telescoping assembly will now enable the user to rotate the selecting element 18 of the tuner from channel to channel whether the knob 26 is fully inserted or pushed in to be flush with the front of the set as shown in Figure 5 or whether the knob has been pulled out together with the telescoping assembly 15 for control at a distance as shown in Figures 1, 3 and 4.

In Figure 6 I have shown the telescopic assembly 16 for operating the on-off switch and volume control 13 which may be of standard arrangement and construction and mounted within the interior of the cabinet 10.

Here again the shaft 27 which carries the operating member 48 of the on-off switch and volume control is squared to match the telescopic extension 16 which nests therein so that rotation of the knob 28 at the front end of the telescopic assembly will always result in rotation of the operating member 48 whether the telescopic assembly 16 has been pushed in to place the knob 28 flush with the front of the set or whether it has been extended as shown in Figures 1 and 6.

For this purpose, the rectangular shaft 27 will extend back a sufficient distance to provide an appropriate housing for the telescopic assembly when it is collapsed or telescoped.

Figure 7:
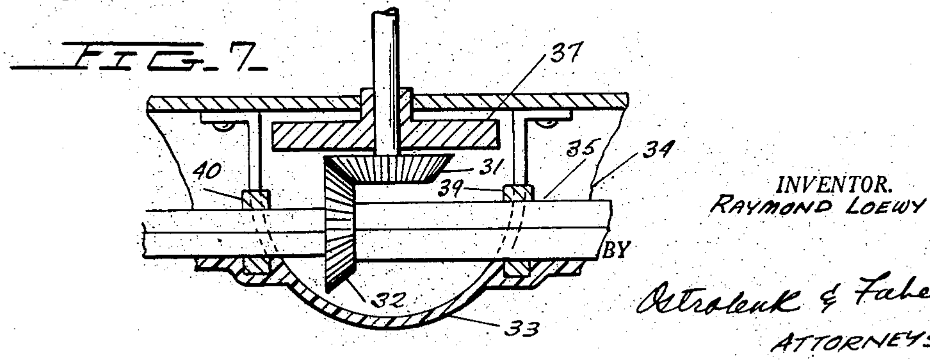
Figure 7 is a cross-sectional view taken from line 7—7 of Figure 2 showing the method of operation of the side mounted extensible control members.

The rectangular shaft 27 is provided with a collar 29 having a circular outer circumference so that the shaft 27 may rotate in the bearing 30. In side mounted controls as shown in Figures 2 and 7, it is necessary to change the direction of operation so that the operator may manipulate these controls while sitting in front of the set.

In this case, no modification of the tuner structure or of the other controls may be required. Instead, the knob of the tuner or of the other controls is replaced by the bevel gear 31 which in turn meshes with the bevel gear 32 in the housing 33. The rear end of the housing 33 is extended at 34 to provide an enclosure for the rectangular member 35 carried by bevel gear 32. The circular member 35 is secured to the bevel gear 32 so that rotation of rectangular member 35 results in rotation of bevel gear 32 and hence of bevel gear 31, thereby operating the tuner or other control to which it is connected.

The housing 33 may be cut away at its upper and lower ends as indicated at 36 of Figure 2 so that a knob 37 coaxial with the bevel gear 31 is provided for direct operation of the tuning or control member from the side.

The extensible telescoping elements 115 are of a cross-section to match the cross-section of member 35 secured to the bevel gear 32 so that rotation of the telescoping assembly 115 will result in rotation of member 35 and hence of bevel gear 32 and of the tuner or control member.

Knob 126 at the front of telescoping assembly 115 will thus operate the tuner or control member so that the telescoping assembly 115 is fully extended or fully pushed back so that the knob 126 is pushed against extension 38 of the housing 33. The shaft 34 is provided with collars 39 and 40 having a circular outer surface cooperating with appropriate bearings in the housing 33 to permit rotation of the rectangular shaft 35. Here again the hollow shaft 35 and the telescoping members 115 will have an appropriate cross-section so that rotation of any of the elements thereof will cause rotation of all the others.

Identical controls may thus be provided for the tuner, the on-off and volume control member and any other control member, and consequently these controls are shown in duplicate in Figure 2.

It will also be obvious that where it is necessary to operate the brightness or contrast control or other controls whether in the construction of Figure 1 or in the construction of Figure 2, additional extensible knobs may be provided.

As a practical matter, it may only be necessary to provide the extensible control for the tuner where the television set is to be used primarily in non-fringe areas since the volume control setting and all other settings including the fine tuner setting will remain fairly constant for every channel.

Figure 8:
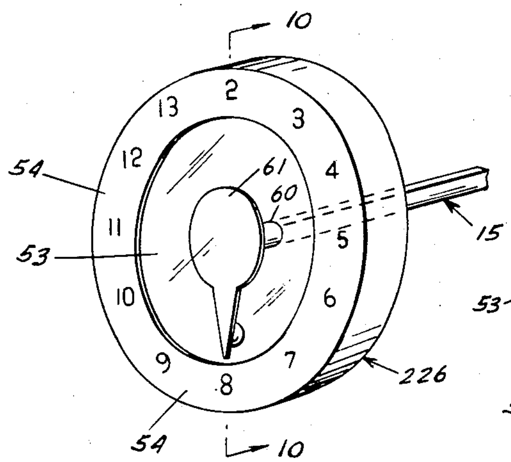
Figure 8 is a view in perspective showing one form which the extension operating knob for the tuner may take so that the user may have an indication at the extended end of the operating mechanism of the channel to which his set is tuned.
Figure 10:
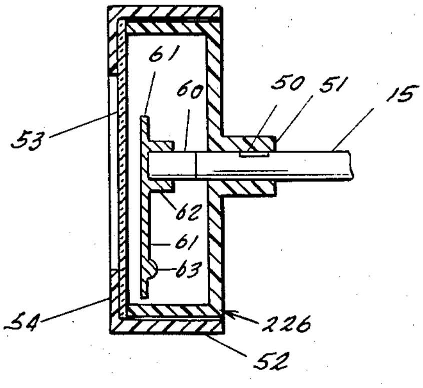
Figure 10 is a cross-sectional view taken on line 10—10 of Figure 8.

Various elements may be added to make my novel operating member more convenient in use. Thus, as shown in Figures 8 and 10, the principal channel selecting operating knob 226 mounted at the end of the shaft 15 may be secured to the end of the extended shaft 15 by the key 50 and, in any event, will serve to operate the extended end of shaft 15 by reason of the fact that the neck 51 of the knob 226 is squared to match the squared cross-section of the end of shaft 15.

A cover piece 52 may be mounted over and secured to the face of the knob 226, the knob 226 actually comprising a circular container. The cover piece may also position a glass or other transparent cover 53. The annular ledge 54 of the cover piece will have channel indicia.

The end 60 of the extension shaft 15 is turned into circular form and on the said end is rotatably mounted the rotatable pointer 61 having the bearing member 62 which freely rotates on the section 60 of circular cross-section of the extensible member 15.

The pointer 61 is provided with the weight 63 which will always keep the pointer in a vertical position pointing downwardly. Consequently, as the knob 226 is rotated, the pointer will retain its vertical position pointing downwardly and will serve to indicate the particular channel to which the knob 226 has turned the tuning device.

Figure 9:
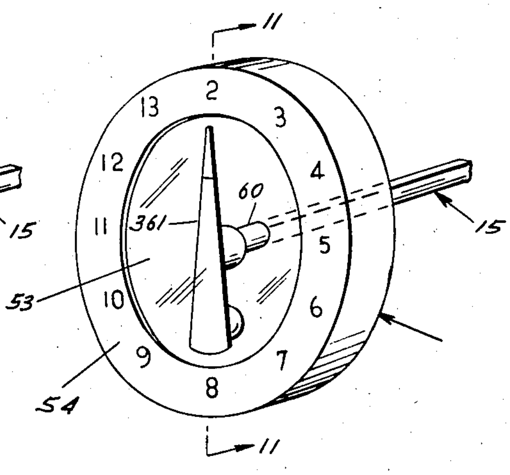
Figure 9 is a view in perspective showing a modified form of the construction of Figure 8.
Figure 11:
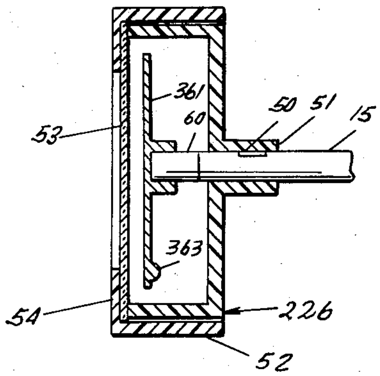
Figure 11 is a cross-sectional view taken on line 11—11 of Figure 9.

In Figures 9 and 11 I have shown a slightly modified form of the structure of Figures 8 and 10 in which all of the identical elements have been given the same reference numbers, except that the pointer 361 which is mounted in the same way as the pointer 61 of Figures 8 and 10 is now so arranged with its weight 363 that the pointer 361 will always point upwardly.

Since a cover glass 53 is used, the indicia and the transparent openings at the front of the knob may be arranged in various alternate ways so that various types of indica presentation may be made. For instance, the visible portion of the pointer may be a red dot visible through an annular transparent track in the cover.

By this means, therefore, the user provided only with an extensible tuning control will be in a position to change channels without leaving the viewing position.

Where the television set, however, has universal application for reception at a distance remote from transmitters as well as reception at distances within a few miles of the transmitter, extensible manipulating elements may be provided for all of the appropriate controls.

By this means, therefore, a simplified manual operating system may be provided for operation of the television set at a viewing distance from the screen wherein these operating members comprise simplified inexpensive mechanical elements which when not in use may be stored entirely within the television set and which may be extended to the distance required for adjustment from the viewing position.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claims.

I claim:

1. An operating member for a television set, said television set having a rotatable control member; said operating member comprising a hollow member of non-circular cross-section connected to said control member and a telescoping operating rod comprising a plurality of nesting slidable members of similar geometric cross-section telescopable into said first-mentioned hollow member and extensible therefrom; and a knob at the outer end of said telescoping operating rod; said knob being selectively movable with said telescoping operating rod to a position away from the television set and to a position flush with the television set.

2. An operating member for a television set, said television set having a rotatable control member; said operating member comprising a hollow member of non-circular cross-section connected to said control member and a telescoping operating rod comprising a plurality of nesting slidable members of similar geometric cross-section telescopable into said first-mentioned hollow member and extensible therefrom; and a knob at the outer end of said telescoping operating rod; said knob being selectively movable with said telescoping operating rod to a position away from the television set and to a position flush with the television set; the connection between said hollow member and said control member comprising a plurality of gears, one of which is secured to said hollow member and another of which is connected to said control member.

3. An operating member for a television set, said television set having a rotatable control member; said operating member comprising a hollow member of non-circular cross-section connected to said control member and a telescoping operating rod comprising a plurality of nesting slidable members of similar geometric cross-section telescopable into said first-mentioned hollow member and extensible therefrom; and a knob at the outer end of said telescoping operating rod; said knob being selectively movable with said telescoping operating rod to a position away from the television set and to a position flush with the television set, an extension of the outer end of the telescoping operating rod, a pointer rotatably mounted on said extension, a recess in the knob, said pointer being contained with said recess, means for holding said pointer stationary while said knob rotates and indicia on said knob cooperating with said pointer.

References Cited in the file of this patent

UNITED STATES PATENTS

| | | |
|---|---|---|
| 1,506,334 | Bovey | Aug. 26, 1924 |
| 1,611,236 | Rodgers | Dec. 21, 1926 |
| 1,732,709 | Bartholomew | Oct. 22, 1929 |
| 2,036,948 | McNary | Apr. 7, 1936 |
| 2,481,966 | Zivi | Sept. 13, 1949 |
| 2,524,508 | Barnes | Oct. 3, 1950 |

FOREIGN PATENTS

| | | |
|---|---|---|
| 575,709 | Germany | May 2, 1933 |
| 640,390 | Great Britain | July 19, 1950 |